July 24, 1951 M. SOUDERS, JR 2,562,068
SEPARATION OF XYLENE ISOMERS BY SOLVENT EXTRACTION
Filed April 26, 1948 2 Sheets-Sheet 1
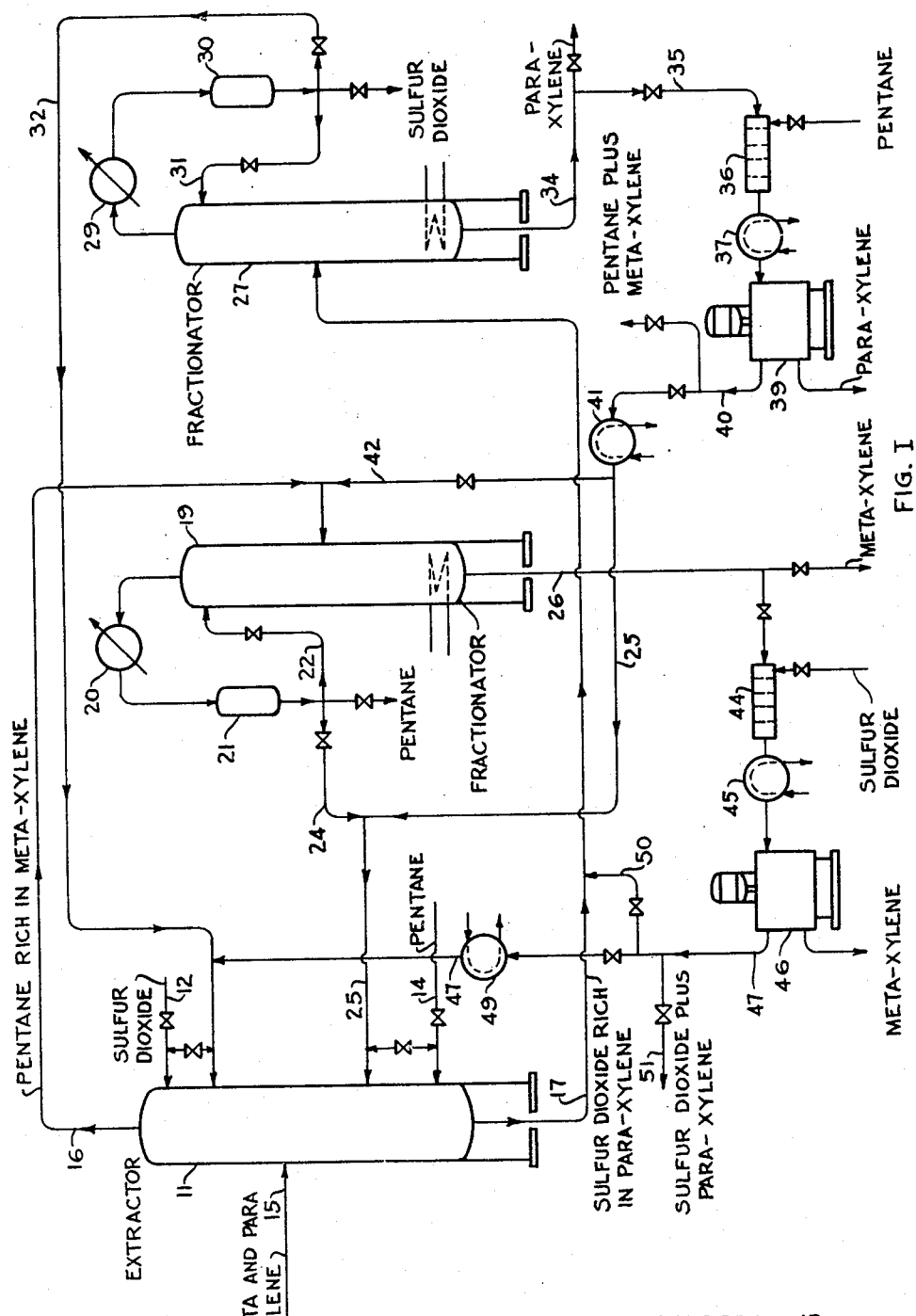
FIG. I
INVENTOR: MOTT SOUDERS JR.
BY HIS AGENT: John H. Colvin

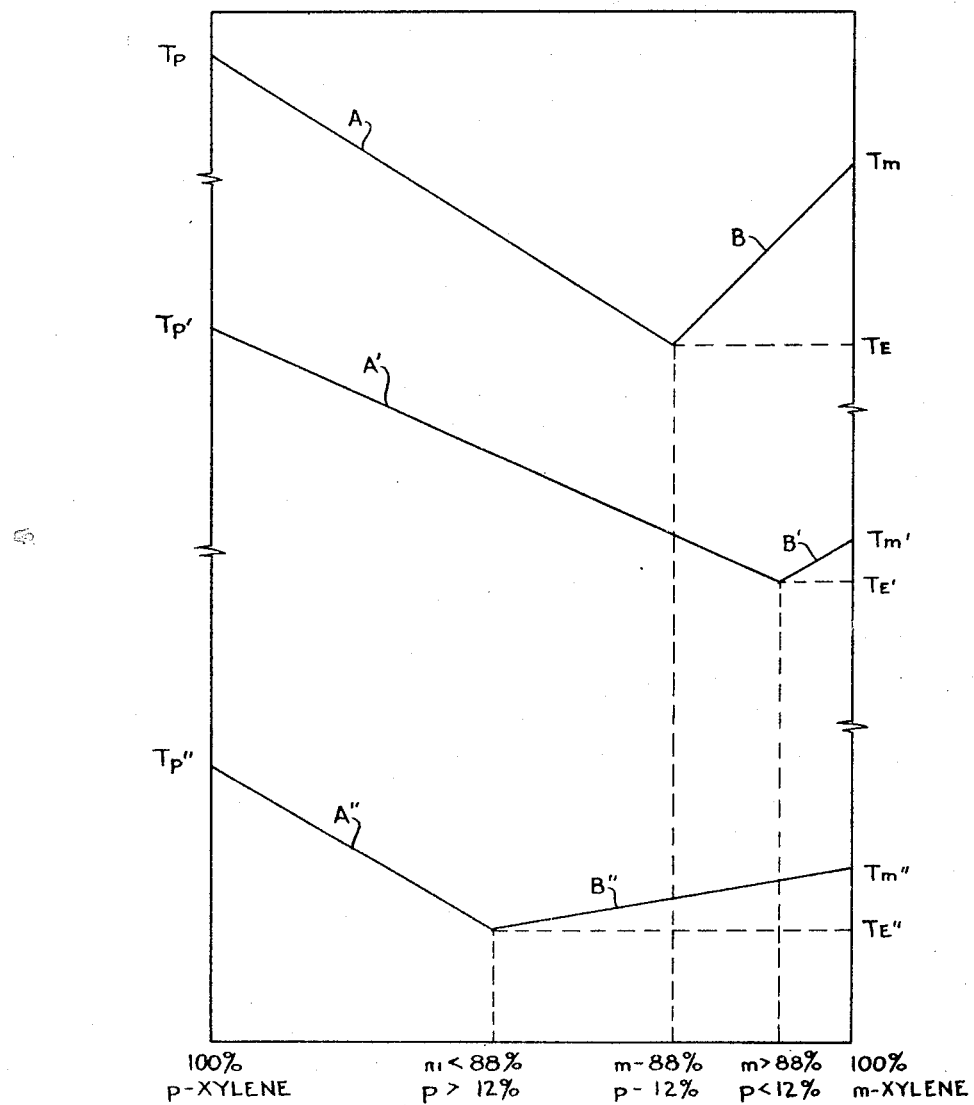
FIG. II

Patented July 24, 1951

2,562,068

UNITED STATES PATENT OFFICE 2,562,068

SEPARATION OF XYLENE ISOMERS BY SOLVENT EXTRACTION

Mott Souders, Jr., Piedmont, Calif., assignor to Shell Development Company, San Francisco, Calif., a corporation of Delaware Application April 26, 1948, Serial No. 23,372

16 Claims. (Cl. 260—674)

This invention relates to a method for the separation of mixtures of organic compounds, and particularly to the separation of isomeric organic compounds. More specifically, the invention is concerned with the separation and purification of substituted aromatic compounds from one or more isomers thereof by a solvent extraction process. In a more limited aspect, the invention is concerned with the separation of a mixture of two isomeric aromatic hydrocarbons, i. e. alkyl-substituted aromatic hydrocarbons having the same empirical formula, such as a mixture of meta-xylene and para-xylene, by a method involving a solvent extractive separation of the two substances.

Mixtures of certain aromatic hydrocarbons, such as benzene, alkyl benzenes (toluene, xylenes, etc.), hydroxyl-benzenes and hydroxyl alkyl benzenes (phenol, cresols, xylenols, etc.) are produced as by-products from the coking of coal and also from certain petroleum conversion and separation processes. Mixtures of still other aromatic compounds, such as the nuclear-halogenated derivatives, nuclear-nitro-derivatives, nuclear-aminated derivatives, etc., of benzene, toluene, naphthalene, and the like, are produced by suitable halogenation, nitration, and nitration followed by reduction, reactions of the corresponding aromatic compound as well as alkylation, for example, of substituted benzene derivatives. Similarly, mixtures of closely related non-aromatic compounds, both cyclic as well as aliphatic compounds, such as mixtures of sterols from natural sources, mixtures of carbohydrates from natural or synthetic sources, mixtures of acids, particularly of polycarboxylic acids and of hydroxy-carboxylic acids and also of higher molecular weight fatty acids, mixtures of halogenated non-aromatic hydrocarbons, and the like are often dealt with in the industry and their resolution into the constituent molecular species is desired.

It is already known to effect the separation of mixtures of different substances by means of solvents. Thus, solvents have been applied for the separation of members of a homologous series, e. g. methyl alcohol and amyl alcohol, mixtures of organic substances which differ in the number of polar groups they contain, e. g. mononitrobenzene and dinitrobenzene, and mixtures which differ in the intensity of the polar groups they contain, e. g. furfural and furfuryl alcohol. It has also been suggested generally to separate mixtures of isomeric organic compounds in which the isomerism is due to a difference in place of polar groups and which have different solubilities in certain solvents by extracting the mixture simultaneously with two different organic solvents which, under the conditions of the extraction, are at least partially immiscible with one another. It is also known to employ fractional crystallization for the separation of such mixtures. In order to improve the separation by crystallization, since such mixtures generally form eutectic mixtures upon partial crystallization of one of the components, it has been proposed to effect the crystallization even at temperatures below the normal eutectic temperature but in the presence of an organic diluent.

In general, the methods heretofore available have not been entirely satisfactory for the separation and recovery of the constituents of many mixtures of organic compounds, and particularly of mixtures of closely related organic substances which have similar boiling points and which form eutectics upon being cooled.

It is, therefore, a principal object of the present invention to provide an efficient and economical process for the separation of mixtures of organic compounds which have similar physical properties. A further object is to provide an improved method for the separation and recovery of one organic compound from a molecular isomer thereof, such isomers having the same empirical formula and the same types of functional groups. Another object is to provide an improved method for the separation and recovery of one aromatic compound from a mixture thereof with a closely related compound, wherein the compounds are molecular isomers and the isomerism is due to a difference in the position of at least one substituent group in the aromatic nucleus of the compounds. A still further object is the separation of one alkyl-substituted aromatic hydrocarbon (i. e. an alkylaromatic hydrocarbon) from a mixture thereof with a different alkyl-substituted aromatic hydrocarbon, the two hydrocarbons having similar boiling characteristics and being difficult to separate by the usual physical methods. A more specific object is concerned with the separation and recovery separately of meta-xylene and para-xylene from a mixture thereof. Another specific object is concerned with the separation of the components of a mixture of alpha- and beta-ethylnaphthalene. Still another object is to provide an improved process for the separation of the components of a mixture of hetero-aromatic compounds which contain similar substituent groups, more particularly only alkyl-substituent groups, and which compounds have relatively similar physical properties. Other specific objects are to provide an improved process for the separation of the components of a mixture of isomeric mono-alkyl pyridines, of isomeric di-alkyl pyridines, and of isomeric alkyl thiophenes.

The above-mentioned objects of the invention and the method of attaining them will be more fully understood, and other objects will become apparent, from the description of the invention as given hereinafter.

Now, in accordance with the present invention, it has been found that components of such mixtures can be separated in an improved manner by subjecting the mixture to extraction simultaneously with two solvents, X and Z, which solvents under the conditions of the extraction are at least partially immiscible with one another, and which are selected such that, under the conditions of the extraction, the algebraic difference between the heats of solution in each of the solvents is greater for one of the components of the mixture to be separated than is the difference between the corresponding heats of solution for the other component of the mixture to be separated, and preferably one of the solvents is an inorganic compound.

Described broadly, the invention contemplates the separation of two components A and B from a mixture thereof, wherein A and B are molecularly isomeric organic compounds having the same empirical formula and the same kind of functional groups (such as alkyl, hydroxyl, carbonyl, carboxyl, amino, nitro, etc.) and are difficult to separate because of their relatively similar boiling temperatures, solubilities, and the like, and in many instances form eutectic mixtures, by subjecting the mixture to liquid-liquid extraction simultaneously with two solvents, as defined hereinbefore, one of which (X) is preferably an inorganic liquid such as sulfur dioxide, antimony trichloride, nitrous oxide, nitrogen tetroxide, hydrogen fluoride, and the like, and thereby forming two liquid phases in which the components A and B are distributed in different proportions. As illustrative of this broad aspect of the invention is the separation of the components of a mixture of meta-xylene and para-xylene by subjecting the mixture to the extracting action of counterflowing bodies of liquid sulfur dioxide (X-solvent) and normal pentane (Z-solvent) with resulting enrichment of the meta-xylene in the separated pentane liquid phase and enrichment of the para-xylene in the separated liquid sulfur dioxide phase. Sulfur dioxide and pentane are a pair of solvents wherein the algebraic difference between the heats of solution of para xylene therein is greater than the corresponding difference between the heats of solution of meta xylene.

The invention also contemplates the combination of the foregoing-described dual solvent extraction with operations involving the fractional crystallization separation of one or both of the components A and B from either or both of the mixtures recovered separately from the two solvent extract phases. The invention contemplates particularly the partial crystallization of the component A from the recovered mixture of A and B, which is enriched in component A and which is recovered from one of said solvent extract phases, from a solution of said recovered mixture dissolved in a portion of the other solvent, and/or similarly for the crystallization separation of component B from the other solvent extract phase. As illustrative of this aspect of the invention, the meta-xylene enriched fraction, which is recovered from the pentane extract as described before, is dissolved in the other solvent, sulfur dioxide, and the solution is chilled to produce crystals of meta-xylene. Similarly, the para-xylene enriched fraction, which is recovered from the sulfur dioxide extract, may be dissolved in pentane and the resulting solution chilled to produce crystals of para-xylene. The respective mother liquors may be advantageously returned to the dual solvent extraction operation.

Having described the invention in its broad aspects, it will now be described in greater detail with reference to one preferred embodiment thereof, which is to be construed as in no way limiting the invention, and which application will aid in an understanding of the various factors involved in the invention and the proper co-ordination of them which is required in the application of the invention to various mixtures.

Referring to Figure I of the accompanying drawing, which is a schematic flow diagram for the separation of meta-xylene and para-xylene in accordance with the process of the present invention, 11 represents a countercurrent extraction apparatus, which may, for example, comprise a tower filled with suitable packing material, such as Raschig rings, Berle saddles, etc., for effecting an intimate contact between counterflowing liquids. The extraction apparatus may comprise or consist of alternate mixing and settling zones, or of any other type of appaatus which is suitable for the countercurrent contacting of one liquid phase with another. Liquid sulfur dioxide and a low-boiling paraffinic hydrocarbon such as n-pentane are introduced into the countercurrent extraction zone at spaced points, such as by means of lines 12 and 14, respectively, so as to provide one or more countercurrent stages between the points of introduction of the solvents. A mixture of meta- and para-xylenes is preferably introduced at an intermediate point in the extraction zone, such as by means of line 15; it may, however, be introduced near one end of the apparatus, if desired, together with one of the solvents.

In the extraction zone, the sulfur dioxide preferentially dissolves the para-xylene and the pentane preferentially dissolves the meta-xylene. The pentane extract, which is enriched in meta-xylene, is withdrawn from the upper part of the extractor by means of a line 16 and the sulfur dioxide extract which is enriched in para-xylene is withdrawn from the lower part of the extractor through a line 17. Suitable backwash may be provided at the respective ends of the extractor, if desired, as will be well understood by those skilled in the art. Also, various means may be provided for adjusting and controlling the temperature at various points in the extraction zone. The ratios of the various substances being contacted (the two solvents and the feed mixture, considering also the ratio of meta- and para-xylenes in said feed mixture) are adjusted in consideration of the overall efficiency of the given extractor, the conditions of contacting and the desired separation to be effected.

The withdrawn pentane extract is subjected to a fractionation in fractionator 19, wherefrom the pentane is removed as an overhead distillate which is condensed in cooler 20 and collected in vessel 21. A portion of the condensed distillate may be returned through a line 22 as reflux to fractionator 19. A portion or all of the remaining separated pentane may be, and preferably is, returned to the extractor through lines 24 and 25. The separated xylene fraction, which is enriched in meta-xylene, relative to the meta-xylene content of the feed mixture, is withdrawn from fractionator 19 through a line 26.

The sulfur dioxide extract in line 17 is transferred thereby to a fractionator 27, wherefrom the sulfur dioxide is separated as overhead distillate, which is condensed in condenser 29 and collected in vessel 30. A portion of the condensed sulfur dioxide distillate may be returned through line 31 as reflux to fractionator 27, if desired. A portion or all of the remaining recovered sulfur dioxide fraction may be, and preferably is, returned to the extractor through line 32. If desired, and depending on the selected conditions of operation of the extractor and the two fractionators, the recovered pentane and sulfur dioxide fractions, which may contain some of the xylene mixture, may be introduced into the extractor at points as indicated by lines 25 and 32, respectively, which are displaced from the respective ends of the extractor one or more plates further than the inlets for lines 14 and 12, and thereby improve the separation. However, a portion or all of these recovered solvent fractions may be delivered to lines 14 and 12, respectively, or a portion of any fresh make-up solvent may be delivered to lines 25 and 32 and introduced therethrough to the extractor. The separated xylene fraction, which is recovered from the sulfur dioxide extract in fractionator 27, and which fraction is enriched in para-xylene, is withdrawn through a line 34.

Thus, by this process, a mixture of meta- and para-xylenes is effectively separated into two fractions, one of which is substantially enriched in meta-xylene and the other is substantially enriched in para-xylene, the separation being effected by a pair of solvents, neither of which has heretofore been considered to exhibit any solvent selectivity between meta- and para-xylene.

Further purification of the para-xylene and of the meta-xylene fractions may be effected by fractional crystallizations of the respective xylenes from solutions of those fractions dissolved in solvents, respectively, which yield eutectic (pseudo-eutectic) mixtures which correspond to more favorable crystallization of the desired xylene than may be obtained by a crystallization from a mixture consisting only of said xylenes. This will be explained hereinafter in greater detail with reference to Fig. II. Thus, the para-xylene fraction, which is recovered from the sulfur dioxide extract, may now be dissolved in pentane, or some similar organic solvent such as a light paraffinic hydrocarbon, a low-freezing alcohol or ketone, etc., and cooled to produce crystals of para-xylene substantially free from meta-xylene. The solution may be advantageously cooled to a temperature which is even substantially lower than the normal eutectic temperature (about —58° C.) of a mixture of meta- and para-xylenes. This additional sequence of operations is indicated in the drawing, wherein any portion or all of the para-xylene fraction in line 34 is transferred through a line 35 to a mixer 36, wherein it is mixed with pentane solvent and the solution is then chilled in cooler 37, by means of a suitable refrigerant in out-of-contact heat exchange therewith. If desired, the refrigeration may be effected entirely or in part by evaporation of a portion of the pentane solvent under reduced pressure and/or evaporation of a still lower boiling substance such as propane or butane which has been admixed with the solution. Upon cooling the solution to a temperature below —60° C. the major proportion of the para-xylene is crystallized out. The resulting slurry is then separated in centrifuge 39 into a para-xylene crystalline product and a mother liquor which is withdrawn through line 40. If desired, any portion or all of the separated mother liquor in line 40, which, in general, contains a larger proportion of meta-xylene than para-xylene and in general contains them in a ratio of meta-xylene to para-xylene which is greater than the corresponding ratio in the normal eutectic mixture thereof, may be returned to the extractor 11 by means of line 25, the temperature of the solution being adjusted any required amount by means of heat exchanger 41. It will be understood that heat economies may be effected by heat exchange between the para-xylene fraction in line 34 and the mother liquor in line 40. Any portion or all of the mother liquor in line 40 may be delivered to fractionator 19 by means of line 42 wherein the xylene content is separated from the pentane solvent. This latter operation is particularly advantageous because the xylene content of this solution generally is more than about 88% by weight para-xylene and, therefore, can be advantageously fractionally crystallized from pentane.

In a similar manner, any part or all of the meta-xylene fraction in line 26 is mixed with and dissolved in sulfur dioxide in mixer 44 and chilled in cooler 45, preferably to a temperature which is even substantially lower than the normal eutectic temperature of a mixture of meta- and para-xylenes, but not so low as to result in the crystallization of a new eutectic (pseudo-eutectic) mixture. The resulting slurry of meta-xylene crystals in the remaining mother liquor, which remaining mother liquor contains para-xylene and meta-xylene in a ratio in that order which is greater than the corresponding ratio in the normal eutectic mixture of para- and meta-xylenes, is separated by any suitable means such as centrifugation, filtration, settling and decantation, etc., and as represented by centrifuge 46. The separated mother liquor is returned through line 47, through heat exchanger 49 if required, to line 32 and the extractor 11. If desired, any part or all of the mother liquor in line 47 may be delivered through line 50 to line 17 and to the fractionator 27 for separating the sulfur dioxide from the xylene content thereof, and/or withdrawn through line 51.

The crystallization operations as described hereinbefore with reference to Fig. I, and the characteristics of the solvents X and Z (sulfur dioxide and pentane, respectively, in the separation of meta- and para-xylenes, will be more readily understood from the following description which is made with reference to Fig. II, which represents graphically the temperature-composition liquid-solid phase relationships for mixtures of para-xylene and meta-xylene, alone and when separately dissolved in n-pentane and in sulfur dioxide. Referring to Fig. II, the three curves AB, A'B' and A"B" are the temperature-composition liquid-solid phase lines for mixtures of para-xylene (A) and meta-xylene (B), either alone, dissolved in a solvent Z (n-pentane) in proportions such that there results a solvent concentration of "z" mol-percent in the solution which remains at temperature $T_E'$, or dissolved in a solvent X (sulfur dioxide) in proportions such that there results a solvent concentration of "$x$" mol-percent in the solution which remains at temperature $T_{E''}$. $T_p$ and $T_m$ are the melting points, respectively, of pure para-xylene and of pure meta-xylene; $T_{p'}$ and $T_{m'}$ are the temperatures of saturation of solvent Z with para-xylene and with meta-xylene, respectively, at the given solvent concentration; and $T_{p''}$ and $T_{m''}$ are the temperatures of saturation of solvent X with para-xylene and with meta-xylene, respectively, at the given solvent concentration. $T_E$, $T_{E'}$ and $T_{E''}$ are temperatures, respectively, at which mixtures of para-xylene and meta-xylene in the indicated proportions crystallize as eutectics or pseudo-eutectics, without change of composition, from solutions of para-xylene and meta-xylene alone, in solvent Z at the indicated concentration and in solvent X at the indicated concentration, respectively. It is to be noted that in the case of the corresponding eutectic and pseudo-eutectic compositions at $T_E$, $T_{E'}$ and $T_{E''}$, the ratios of the parts by weight of para-xylene to meta-xylene are such that $(a'':b'') > (a:b) > (a':b')$, wherein the small letters represent respective parts by weight of para-xylene and of meta-xylene, for the respective eutectic or pseudo-eutectic compositions. Curves A'B' may be above curves A''B'', relative to temperature (as shown), or the order may be reversed or they may actually intersect at one or more points.

For economical operations of the fractional crystallization part of the present invention, the solvent concentration should be at least about 10 mol per cent. For instance, for the meta-, para-xylene, sulfur dioxide system, the slope of the line representing separation of solid meta-xylene, as will be seen from lines B and B'' of Fig. II, decreases as the concentration of the solvent is increased. For the most economical operation in this case, a solvent concentration of from about 40 to about 60 mol per cent has been found to be most suitable, although it may be up to about 90 mol per cent. The eutectic temperature $T_E$ is about $-53°$ C. while the pseudo-eutectic temperature $T_{E''}$ is about $-68°$ C. For 60 mol per cent sulfur dioxide at the pseudo-eutectic composition, the temperature may be adjusted to a value of from about $-58°$ C. to about $-68°$ C. for suitable separation of meta-xylene from mixtures containing meta- and para-xylenes in a ratio greater than that represented by the equilibrium composition on curve B'' corresponding to the temperature selected. The pseudo-eutectic composition contains meta- and para-xylenes in a ratio of at least 50:50, depending on the solvent concentration. Similar considerations apply to the crystallization of para-xylene from a solution of para- and meta-xylenes dissolved in pentane. Similarly for the partial crystallization of components of other mixtures from solutions of said mixtures in other solvents X and Z, as already defined. The solvent concentration ranges which are suitable and those most economical in the practice of the invention, as applied to a particular separation and with a given selection of solvent(s), depend upon the various interrelated properties of the substances involved and can be readily determined by experiment as will now be readily understood by one skilled in the art.

The coordinated combination of solvent extraction operations and of fractional crystallization operations described hereinbefore with reference to Fig. I is made possible by the fact that the solvent (sulfur dioxide) which exhibits the effective selectivity for the para-xylene under the conditions of the solvent extraction and which exhibits the properties as already specified in the broad statement of the invention, at the same time is a solvent, by virtue of those same properties, from which meta-xylene is first crystallized upon cooling a solution of a normal eutectic mixture of meta- and para-xylenes dissolved in said solvent to a temperature below the normal eutectic temperature of a meta- and para-xylene mixture, and the solvent (pentane) which exhibits the effective selectivity for the meta-xylene under the conditions of the dual solvent extraction is, at the same time, a solvent from which a greater amount of para-xylene can be crystallized by cooling, to a temperature below the normal eutectic temperature, a solution of a mixture of para- and meta-xylenes in said solvent (pentane) when said mixture contains a larger proportion of para-xylene than the normal eutectic mixture of para- and meta-xylenes.

In order to assist one in the selection of suitable solvent pairs X and Z for a given mixture a number of relationships are noted. For mixtures of hydrocarbons, solvents therefor which are low freezing and substantially inert, such as lower molecular weight aliphatic hydrocarbons (ethane, propane, butane, pentane, etc.) and related substances which exhibit little bonding character, such as methanol, ethanol, diethyl ether, acetone, methyl chloride, methylene chloride, ethylene chloride, and the like, are solvents of the character of Z solvents. Solvents of the X class are those which associate more strongly with one of the constituents of the mixture to be separated than with the other constituent. Such solvents may be recognized by the heat effect upon separately dissolving in them each of the pure constituents of said mixture. With X-solvents, the thermodynamic heat of solution when one of the constituents is dissolved therein differs from the thermodynamic heat when the same constituent is dissolved in an ideal solvent therefor and this difference is greater for one of the constituents than for the other constituent. Thus data published in the "Journal of the American Chemical Society," volume 59, page 362 (1937), show that sulfur dioxide is an X-solvent for the separation of meta- and para-xylenes. With Z-solvents the ratio of the heat of solution to the heat of fusion is smaller for the lower melting than for the higher melting constituent. Particularly important substances in the X-class of solvents are inorganic molecular solvent substances, such as sulfur dioxide, ammonia, hydrogen fluoride, liquid carbon dioxide, hydrogen sulfide, hydrogen selenide, hydrogen telluride, arsine, stibine, arsenic pentafluoride, carbon disulfide, carbonyl bromide, chloro-sulfonic acid, chromyl chloride, nitrous oxide, nitrogen tetroxide, nitrogen trioxide, perchloric acid, phosphorus tribromide, phosphorus trichloride, phosphorus oxychloride, silicon tetra chloride, stannic chloride, sulfur monochloride, sulfur dichloride, titanium tetrachloride, vanadium tetrachloride and vanadyl trichloride. Combinations of individual solvents of the two classes may be utilized, so long as they form a compatible solvent mixture.

In the selection of a suitable solvent pair for a given mixture, it will be understood that consideration will be given to such factors as, melting points of the solvents, melting points of the components of the mixture to be separated, chemical inertness of the solvents toward each other and toward the components of the mixture, and the like. In general, it is preferred to employ solvents which remain liquid below the freezing points of the components of the given mixture.

Mixtures of various substances may be advantageously separated by application of the present invention, such as mixtures of aromatic hydrocarbons (alkyl benzenes, alkyl naphthalenes, aralkyl benzenes, etc.), mixtures of alkyl-substituted hetero-aromatic hydrocarbons (monoalkyl pyridines, dialkyl pyridines, monoalkyl thiophenes, dialkyl thiophenes, etc.), mixtures of aromatic hydrocarbon derivatives (such as those containing hydroxyl, alkoxy, amino, alkylamino, halogen, carboxyl, acyl, sulfonic, etc., groups) and mixtures of aliphatic organic compounds, particularly oxygenated compounds such as those containing carboxyl, carbonyl, amido, hydroxyl, sulfonamido, etc., groups and in particular those containing a plurality of substituent groups per molecule.

The extraction operation of the invention may be executed under various conditions of temperature, pressure, relative rates of flow of the solvents and the feed mixture, and the like, as will be understood by those skilled in the art in view of the description of the invention. It is preferable to effect the extraction at a temperature which approaches as nearly as feasible, from about 1° C. to about 25° C., to the temperature at which crystallization of one of the mixture-components would begin to be effected from the solution, i. e. the crystallization temperature of the system. In general, a suitable extraction temperature ranges from the above-indicated crystallization temperature of the system up to the melting point of the highest melting constituent of the mixture, or even higher in many cases.

Preferably the extraction process of the invention is carried out in such a manner that the two extracting liquids are made to flow in countercurrent along or through each other, as described with reference to Fig. I, but a single-stage extraction may also be employed. It may be carried out continuously or in batch operations. The crystallization operations may be carried out in a substantially continuous manner, a semi-continuous manner, or batch-wise.

The invention is applicable for the separation of mixtures of more than two substances, e. g. mixtures consisting of components A, B and C, for instance mixtures of meta-xylene, para-xylene and ethyl benzene, or of ortho-xylene, meta-xylene and para-xylene, or of all four of these substances. Accordingly, a separation may be effected, according to requirements, between A+B on the one hand and C on the other hand, A+C on the one hand and B on the other hand, or between A on the one hand and B+C on the other hand, by varying the conditions, e. g. the quantities and the nature of the extracting liquids, the temperature of the extraction treatment and the like, the solvents from which the crystallizations are carried out, etc. The mixtures A+B, A+C and B+C may be separated in subsequent operations in accordance with the invention.

The following descriptions of embodiments of the invention will serve to illustrate more clearly the application of the invention, but they are not to be construed as in any manner limiting the invention thereto:

*Example I*

One mol part of a mixture of meta-xylene and para-xylene, in a mol ratio (same as weight ratio in this case) of five and two-thirds mols of meta-xylene to one mol of para-xylene, was intimately mixed simultaneously with about three mol parts of normal pentane and three and three-fourths mol parts of sulfur dioxide, the mixture being maintained at about —68° C., which is near the lowest permissible temperature without crystal separation. The resulting mixture was permitted to stratify, whereby two layers were formed. The upper layer (substantially pentane) was found to contain meta- and para-xylenes in the mol ratio of about eight to one, meta to para. The lower (sulfur dioxide) layer contained the xylenes in the ratio of three to one, meta to para. Thus, the upper (pentane) layer was enriched with respect to meta-xylene, relative to the original xylene mixture, while the lower (sulfur dioxide) layer was enriched with respect to para-xylene.

When the foregoing operations are extended to a plurality of stages, as in a continuous countercurrent contacting operation or in a process involving a plurality of coordinated mixing, settling and separating steps as is customary in plural-stage solvent extraction operations, an effective separation between the meta- and para-xylenes is obtained.

*Example II*

When nine mol parts of a mixture of meta-xylene and para-xylene, in a mol ratio of eight parts of meta-xylene to one part of para-xylene, is mixed with about three and three-fourths mol parts of liquid sulfur dioxide, whereby a solution of the three components is formed, and the resulting solution is cooled to a temperature of about —68° C., crystals of substantially pure meta-xylene separate from the solution in an amount corresponding to about six and one-half mol parts.

*Example III*

A further application of the invention is illustrated in this embodiment starting with a commerically available mixture of xylenes containing the following substances in the indicated proportions: ortho-xylene, 1.7; meta-xylene, 39.9; para-xylene, 14.1; ethylbenzene, 42.8; and other hydrocarbons, 1.5. When 100 mol parts of this mixture is chilled to a temperatue of about —75° C., there results crystallization therefrom of about 8 mol parts of a para-xylene product. The separated para-xylene product contains about 98% of para-xylene, the remainder being about equal parts of meta-xylene and ethylbenzene. The separated remaining liquid mixture, about 92 mol parts, contains about 43% meta-xylene, about 6.3% para-xylene, and about 47% ethylbenzene. Further cooling of this remaining liquid mixture results in the separation from the solution of a crystalline mixture of meta- and para-xylenes in substantially constant ratio, the ethylbenzene functioning largely as a diluent or inert solvent, until a temperature of about —103° C. is reached. A total of about 33 mol parts of a meta-, para-xylene prdouct is thus separated. This product is about 97%, or higher, meta- and para-xylenes, and contains them in the approximate ratio of 7.4 to 1, meta to para. When this last meta-, para-xylene product is melted and subjected to a plural-stage solvent extraction with liquid sulfur dioxide and n-pentane at a temperature of about −65° C., a substantially complete separation between the meta- and para-xylenes therein is effected. The residual liquid product from the second crystallization, amounting to about 58 mol parts, is about 70%, or higher, ethylbenzene, with about 19% meta-xylene, the remainder being about equally distributed between the other three constituents.

Thus, as illustrated in this embodiment, the invention may be advantageously applied to some mixtures by first separating therefrom a suitable mixture of two constituents thereof, as by simultaneous crystallization of two of the constituents, which may follow a prior crystallization of one of the constituents as substantially pure material, which separated mixture serves as feed for the dual solvent extraction process of the invention. One or both, or neither, of the indicated crystallizations may be effected in the presence of a substantially inert diluent, such as ethylbenzene or n-pentane, etc., or of an X-solvent, such as sulfur dioxide.

I claim as my invention:

1. A process for fractionating a mixture containing essentially meta-xylene and para-xylene, which process comprises: extracting said mixture simultaneously with sulfur dioxide solvent and an organic solvent possessing the properties of being low freezing, substantially inert and exhibiting little bonding character under conditions such that all of the contacting substances are maintained in the liquid state, said solvents being at least partially immiscible with each other and substantially chemically inert under the conditions of the process, thereby forming a sulfur dioxide extract phase which is substantially enriched in para-xylene and an organic solvent extract phase which is substantially enriched in meta-xylene; separating said extract phases; separating the xylenes dissolved in the separated organic solvent extract phase from said organic solvent; dissolving the thus-separated xylenes in sulfur dioxide; cooling the resulting solution and thereby producing crystals of meta-xylene substantially free from para-xylene; separating the meta-xylene crystals from the remaining solution; separating the xylenes dissolved in said sulfur dioxide extract phase from said sulfur dioxide; dissolving the thus-separated xylenes in an inert organic solvent therefor; cooling the resulting solution and thereby producing crystals of para-xylene; and separating the para-xylene crystals from the remaining solution.

2. A process for fractionating a mixture containing essentially meta-xylene and para-xylene, which process comprises: extracting said mixture simultaneously with sulfur dioxide solvent and an organic solvent possessing the properties of being low freezing, substantially inert and exhibiting little bonding character under conditions such that all of the contacting substances are maintained in the liquid state, said solvents being at least partially immiscible with each other and substantially chemically inert under the conditions of the process, thereby forming a sulfur dioxide extract phase which is substantially enriched in para-xylene and an organic solvent extract phase which is substantially enriched in meta-xylene; separating said extract phases; separating the xylenes dissolved in the separated organic solvent extract phase from said organic solvent; dissolving the thus-separated xylenes in sulfur dioxide; cooling the resulting solution and thereby producing crystals of meta-xylene substantially free from para-xylene; and separating the meta-xylene crystals from the remaining solution.

3. A process for fractionating a mixture containing essentially isomeric aromatic hydrocarbons A and B having the same type of functional groups, which process comprises: extracting said mixture simultaneously with two solvents X and Z, which solvents under the conditions of the process and in the presence of the mixture are at least partially immiscible with each other, are substantially chemically inert and solvent X is an inorganic molecular liquid whose thermodynamic heat of solution when one of the constituents to be separated is dissolved therein differs from the thermodynamic heat when the same constituent is dissolved in an ideal solvent therefor and this difference is greater for one of the constituents than for the other constituent while solvent Z is an organic liquid possessing the properties of being low freezing, substantially inert and exhibiting little bonding character, thereby forming a solvent X extract phase which is substantially enriched in hydrocarbon A and a solvent Z extract phase which is substantially enriched in hydrocarbon B; separating said extract phases; separating the hydrocarbons dissolved in the separated solvent X extract phase from said solvent X; dissolving the thus-separated hydrocarbons in a portion of solvent Z; cooling the resulting solution and thereby producing crystals of hydrocarbon A substantially free from hydrocarbon B; and separating the crystals of hydrocarbon A from the remaining solution.

4. A process for fractionating a mixture containing essentially meta-xylene and para-xylene, which process comprises: extracting said mixture simultaneously with sulfur dioxide and a lower molecular weight paraffinic hydrocarbon under conditions such that all of the contacting substances are maintained in the liquid state, thereby forming a sulfur dioxide extract phase which is substantially enriched in para-xylene and a paraffinic hydrocarbon extract phase which is substantially enriched in meta-xylene; separating said extract phases; separating the xylenes dissolved in the separated paraffinic hydrocarbon extract phase from said paraffinic hydrocarbon; dissolving the thus-separated xylenes in sulfur dioxide; cooling the resulting solution and thereby producing crystals of meta-xylene substantially free from para-xylene; and separating the meta-xylene crystals from the remaining solution.

5. A process for fractionating a mixture containing essentially isomeric aromatic hydrocarbons A and B having the same type of functional groups, which process comprises: extracting said mixture simultaneously with two solvents X and Z, which solvents under the conditions of the process and in the presence of the mixture are at least partially immiscible with each other, are substantially chemically inert and solvent X is an inorganic molecular liquid whose thermodynamic heat of solution when one of the constituents to be separated is dissolved therein differs from the thermodynamic heat when the same constituent is dissolved in an ideal solvent therefor and this difference is greater for one of the constituents than for the other constituent while solvent Z is an organic liquid possessing the properties of being low freezing, substantially inert and exhibiting little bonding character, thereby forming a solvent X extract phase which is substantially enriched in hydrocarbon A and a solvent Z extract phase which is substantially enriched in hydrocarbon B; separating said extract phases; separating the hydrocarbons dissolved in the separated solvent Z extract phase from said solvent Z; dissolving the thus-separated hydrocarbons in a portion of solvent X; cooling the resulting solution and thereby producing crystals of hydrocarbon B substantially free from hydrocarbon A; and separating the crystals of hydrocarbon B from the remaining solution.

6. A process for fractionating a mixture containing essentially meta-xylene and para-xylene, which process comprises extracting said mixture simultaneously with two solvents which under the conditions of the process and in the presence of the mixture are at least partially immiscible with each other, are substantially chemically inert and for which solvents the algebraic difference between the heats of solution in each of said solvents is greater for one of the constituents of said mixture than for the other constituent and one of which is sulfur dioxide and the other is an organic liquid possessing the properties of being low freezing, substantially inert and exhibiting little bonding character, thereby forming a sulfur dioxide extract phase which is substantially enriched in para-xylene and an organic solvent extract phase which is substantially enriched in meta-xylene, and separating said extract phases.

7. A process for fractionating a mixture containing essentially meta-xylene and para-xylene, which process comprises extracting said mixture simultaneously with two solvents which under the conditions of the process and in the presence of the mixture are at least partially immiscible with each other, are substantially chemically inert and one of which is an inorganic molecular liquid whose thermodynamic heat of solution when one of the constituents to be separated is dissolved therein differs from the thermodynamic heat when the same constituent is dissolved in an ideal solvent therefor and this difference is greater for one of the constituents than for the other constituent while the other is an organic liquid possessing the properties of being low freezing, substantially inert and exhibiting little bonding character, thereby forming an inorganic liquid extract phase which is substantially enriched in para-xylene and an organic solvent extract phase which is substantially enriched in meta-xylene, and separating said extract phases.

8. A process for fractionating a mixture containing essentially isomeric aromatic hydrocarbons having the same type of functional groups, which process comprises extracting said mixture simultaneously with two solvents which under the conditions of the process and in the presence of the mixture are at least partially immiscible with each other, are substantially chemically inert and one of which is an inorganic molecular liquid whose thermodynamic heat of solution when one of the constituents to be separated is dissolved therein differs from the thermodynamic heat when the same constituent is dissolved in an ideal solvent therefor and this difference is greater for one of the constituents than for the other constituent while the other is an organic liquid possessing the properties of being low freezing, substantially inert and exhibiting little bonding character, thereby forming two liquid phases in which said isomers are distributed in different proportions, and separating said phases.

9. The process according to claim 8 wherein the inorganic molecular liquid is liquid sulfur dioxide.

10. The process according to claim 8 wherein the inorganic molecular liquid is liquid ammonia.

11. The process according to claim 8 wherein the inorganic molecular liquid is liquid hydrogen fluoride.

12. A process for fractionating a mixture containing essentially isomeric aromatic compounds having the same types of functional groups, which process comprises extracting said mixture simultaneously with two solvents which under the conditions of the process and in the presence of the mixture are at least partially immiscible with each other, are substantially chemically inert and one of which is an inorganic molecular liquid whose thermodynamic heat of solution when one of the constituents to be separated is dissolved therein differs from the thermodynamic heat when the same constituent is dissolved in an ideal solvent therefor and this difference is greater for one of the constituents than for the other constituent while the other is an organic liquid possessing the properties of being low freezing, substantially inert and exhibiting little bonding character, thereby forming two liquid phases in which said isomers are distributed in different proportions, and separating said phases.

13. A process for fractionating a mixture containing essentially isomeric aromatic compounds having the same types of functional groups, which process comprises extracting said mixture simultaneously with two solvents which under the conditions of the process and in the presence of the mixture are at least partially immiscible with each other, are substantially chemically inert toward each other and toward the constituents of said mixture, and for which solvents the algebraic difference between the heats of solution in each of said solvents is greater for one of the constituents of said mixture than for the other constituent, thereby forming two liquid phases in which said isomers are distributed in different proportions, and separating said phases.

14. A process of fractionating a mixture containing essentially isomeric monocyclic-aromatic compounds A and B having the same type of functional groups which process comprises: extracting said mixture simultaneously with two solvents X and Z, which solvents under the conditions of the process and in the presence of the mixture are at least partially immiscible with each other, are substantially chemically inert toward each other and toward the constituents of said mixture and solvent X is an inorganic molecular liquid whose thermodynamic heat of solution when one of the constituents to be separated is dissolved therein differs from the thermodynamic heat of solution when the same constituent is dissolved in an ideal solvent therefor and this difference is greater for one of the constituents than for the other constituent, while solvent Z is an organic liquid possessing the properties of being low freezing, substantially inert and exhibiting little bonding character, thereby forming solvent X extract phase which is substantially enriched in compound A and a solvent Z extract phase which is substantially enriched in compound B; separating said extract phases; separating the isomeric monocyclic-aromatic compounds dissolved in the separated solvent X extract phase from said solvent X; dissolving the thus-separated monocyclic-aromatic compounds in a portion of solvent Z; cooling the resulting solution and thereby producing crystals of monocyclic-aromatic compound A substantially free from monocyclic-aromatic compound B; and separating the crystals of monocyclic-aromatic compound A from the remaining solution.

15. A process of fractionating a mixture containing essentially isomeric monocyclic-aromatic compounds A and B having the same type of functional groups which process comprises: extracting said mixture simultaneously with two solvents X and Z, which solvents under the conditions of the process and in the presence of the mixture are at least partially immiscible with each other, are substantially chemically inert toward each other and toward the constituents of said mixture and solvent X is an inorganic molecular liquid whose thermodynamic heat of solution when one of the constituents to be separated is dissolved therein differs from the thermodynamic heat of solution when the same constituent is dissolved in an ideal solvent therefor and this difference is greater for one of the constituents than for the other constituent, while solvent Z is an organic liquid possessing the properties of being low freezing, substantially inert and exhibiting little bonding character, thereby forming a solvet X extract phase which is substantially enriched in compound A and a solvent Z extract phase which is substantially enriched in compound B; separating said extract phases; separating the isomeric monocyclic-aromatic compounds dissoved in the separated solvent Z extract phase from said solvent Z; dissolving the thus-separated monocyclic-aromatic compounds in a portion of solvent X; cooling the resulting solution and thereby producing crystals of monocyclic-aromatic compound B substantially free from monocyclic-aromatic compound A; and separating the crystals of monocyclic-aromatic compound B from the remaining solution.

16. A process for fractionating a mixture containing essentially isomeric aromatic compounds A and B having the same types of functional groups, which process comprises: extracting said mixture simultaneously with two solvents X and Z, which solvents under the conditions of the process and in the presence of the mixture are at least partially immiscible with each other, are substantially chemically inert and solvent X is an inorganic molecular liquid whose thermodynamic heat of solution when one of the constituents to be separated is dissolved therein differs from the thermodynamic heat when the same constituent is dissolved in an ideal solvent therefor and this difference is greater for one of the constituents than for the other constituent while the other solvent Z is an organic liquid possessing the properties of being low freezing, substantially inert and exhibiting little bonding character, thereby forming a solvent X extract phase which is substantially enriched in compound A and a solvent Z extract phase which is substantially enriched in compound B; separating said extract phases; separating the aromatic compounds dissolved in the separated solvent Z extract phase from said solvent Z; dissolving the thus-separated aromatic compounds in a portion of solvent X; cooling the resulting solution and thereby producing crystals of compound B substantially free from compound A; and separating the crystals of aromatic compound B from the remaining solution.

MOTT SOUDERS. Jr.

REFERENCES CITED

The following references are of record in the file of this patent:

UNITED STATES PATENTS

| Number | Name | Date |
| --- | --- | --- |
| 2,044,722 | Govers | June 16, 1936 |
| 2,342,990 | Welling | Feb. 29, 1944 |
| 2,398,526 | Greenburg | Apr. 16, 1946 |
| 2,435,792 | McArdle et al. | Feb. 10, 1948 |

FOREIGN PATENTS

| Number | Country | Date |
| --- | --- | --- |
| 459,189 | Great Britain | Jan. 4, 1937 |
| 459,595 | Great Britain | Jan. 11, 1937 |

OTHER REFERENCES

Tausz Zeit. Angewandte Chemie, vol. 32, 175–6 (1919).